(12) United States Patent
Woirhaye et al.

(10) Patent No.: US 10,778,840 B1
(45) Date of Patent: Sep. 15, 2020

(54) SYSTEMS AND METHODS FOR IDENTIFYING UNSOLICITED COMMUNICATIONS ON A COMPUTING DEVICE

(71) Applicant: Symantec Corporation, Mountain View, CA (US)

(72) Inventors: Brendon Woirhaye, Whittier, CA (US); Radoslav Stanev, Tehachapi, CA (US); Anuj Sahai, Pune (IN)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 16/292,561

(22) Filed: Mar. 5, 2019

(51) Int. Cl.
  *H04M 3/436* (2006.01)
  *H04M 15/00* (2006.01)
  *H04M 3/22* (2006.01)
  *H04L 12/58* (2006.01)
  *H04M 3/42* (2006.01)
  *H04M 1/663* (2006.01)

(52) U.S. Cl.
  CPC ............ *H04M 3/436* (2013.01); *H04L 51/12* (2013.01); *H04M 1/663* (2013.01); *H04M 3/2281* (2013.01); *H04M 3/42042* (2013.01); *H04M 15/755* (2013.01)

(58) Field of Classification Search
  None
  See application file for complete search history.

(56) References Cited

U.S. PATENT DOCUMENTS

| | | | |
|---|---|---|---|
| 9,232,052 B1* | 1/2016 | Flaks | H04M 3/38 |
| 9,571,640 B1* | 2/2017 | Chen | H04M 3/436 |
| 2011/0294478 A1* | 12/2011 | Trivi | H04M 3/436 455/415 |
| 2012/0321064 A1* | 12/2012 | Czachor, Jr. | H04M 3/436 379/210.02 |
| 2016/0360036 A1* | 12/2016 | Ansari | H04M 3/436 |

\* cited by examiner

*Primary Examiner* — Antim G Shah
(74) *Attorney, Agent, or Firm* — FisherBroyles, LLP

(57) ABSTRACT

The disclosed computer-implemented method for identifying unsolicited communications on a computing device may include a computing device receiving a communication from an unrecognized phone number; obtaining the unrecognized phone number from the communication; obtaining classification data associated with the unrecognized phone number based on categories of other computing devices contacted by the unrecognized phone number; obtaining a category associated with a phone number of the computing device; determining that the communication is an unsolicited communication based on the classification data and the category associated with the phone number of the computing device; and in response to determining that the communication is unsolicited, performing a security action to manage interactions with the communication from the unrecognized phone number. Various other methods, systems, and computer-readable media are also disclosed.

20 Claims, 7 Drawing Sheets

SYSTEMS AND METHODS FOR IDENTIFYING UNSOLICITED COMMUNICATIONS ON A COMPUTING DEVICE

BACKGROUND

With advancements in computing and automation technologies, users have experienced an increase in receiving communications originating from unknown phone numbers. For example, robocalls are calls from phone numbers using a computerized autodialer to deliver a pre-recorded message. Similar technologies may be used for other types of communication, such as text messages or messages through social media networks. Such technologies may be used by spammers or fraudulent users. Spammers are unwanted callers that may be calling indiscriminately to a large number of recipients. Fraudulent users may include users with malicious intent that are pretending to be someone they are not.

Communications received from unknown phone numbers may make the identifies of the callers difficult to ascertain, and therefore difficult for a user to take any action to manage such calls and/or messages. Conventional methods for identifying incoming communications may not accurately capture the nature of the communication originator. For example, a method of classifying incoming communications may utilize minimum thresholds for various actions that users may have taken for calls from such numbers. The thresholds may specify that to classify a phone number as spam, the phone number must have been blocked by 10 users, reported by 50 users, and/or missed or rejected by 100 users. However, such thresholds may not be easily met, despite the phone number being spam or fraudulent. The phone number may be a temporary number that spam only a limited number of users for a limited or short period of time. User actions for such phone numbers may never reach the thresholds specified above, resulting in the phone number never being classified as spam. Additionally, the collection of data, usually manually provided by users in response to receiving unsolicited communications, may take time and, for newly encountered spam numbers, the time to meet the minimum thresholds to be classified as spam may be lengthy, which may leave, in the interim, the users without any guidance for classifying the unrecognized phone calls.

The instant disclosure, therefore, identifies and addresses a need for systems and methods for identifying unsolicited communications on a computing device.

SUMMARY

As will be described in greater detail below, the instant disclosure describes various systems and methods for identifying unsolicited communications on a computing device.

In one example, a method for identifying unsolicited communications on a computing device may include (i) receiving, by the computing device, a communication from an unrecognized phone number, (ii) obtaining the unrecognized phone number from the communication, (iii) obtaining classification data associated with the unrecognized phone number based on categories of other computing devices contacted by the unrecognized phone number, (iv) obtaining a category associated with a phone number of the computing device, (v) determining that the communication is an unsolicited communication based on the classification data and the category associated with the phone number of the computing device, and (vi) in response to determining that the communication is unsolicited, performing a security action to manage interactions with the communication from the unrecognized phone number.

In some examples, the security action may include (i) presenting, to a user of the computing device, a recommendation to ignore the communication, wherein the recommendation comprises the classification data and a confidence score associated with the classification data, (ii) receiving, in response to presenting the recommendation, an indication to ignore the communication, and (iii) in response to receiving the indication, ignoring the communication. In some examples, the classification data may include an identification of a type of unsolicited communication which may be a spam communication or a fraudulent communication. In some examples, the security action may include (i) identifying a user setting that indicates unsolicited communications are to be blocked and (ii) enforcing the user setting by blocking the communication in response to determining that the communication is unsolicited.

In some examples, the method may include (i) presenting, to a user of the computing device, a request to classify the communication, (ii) receiving, in response to presenting the request, additional classification data for the communication, and (iii) transmitting the additional classification data and user interaction data associated with the communication to a remote server to be used to classify communications from unrecognized phone numbers and categorize phone numbers associated with users.

In some examples, the communication may be a phone call, a message sent through a social networking platform associated with the phone number of the computing device, or a text message. In some examples. the category associated with the computing device may be spam-prone or spam-adverse. In some examples, the category associated with the computing device may be fraud-prone or fraud-adverse. In some examples, the classification data associated with the unrecognized phone number may be based on responses provided by other users. The category associated with the computing device may be based at least in part on types of calls previously received by the computing device.

In one embodiment, a system for identifying unsolicited communications on a computing device may include at least one physical processor and physical memory that includes computer-executable instructions that, when executed by the physical processor, cause the physical processor to (i) receive a communication from an unrecognized phone number, (ii) obtain the unrecognized phone number from the communication, (iii) obtain classification data associated with the unrecognized phone number based on categories of other computing devices contacted by the unrecognized phone number, (iv) obtain a category associated with a phone number of the computing device, (v) determine that the communication is an unsolicited communication based on the classification data and the category associated with the phone number of the computing device, and (vi) in response to determining that the communication is unsolicited, perform a security action to manage interactions with the communication from the unrecognized phone number.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a communication from an unrecognized phone number, (ii) obtain the unrecognized phone number from the communication, (iii) obtain classification data associated with the unrecognized phone number based on categories of other computing devices contacted by the unrecognized phone number, (iv) obtain a category associated with a phone number of the computing device, (v) determine that the communication is an unsolicited communication based on the classification data and the category associated with the phone number of the computing device, and (vi) in response to determining that the communication is unsolicited, perform a security action to manage interactions with the communication from the unrecognized phone number.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
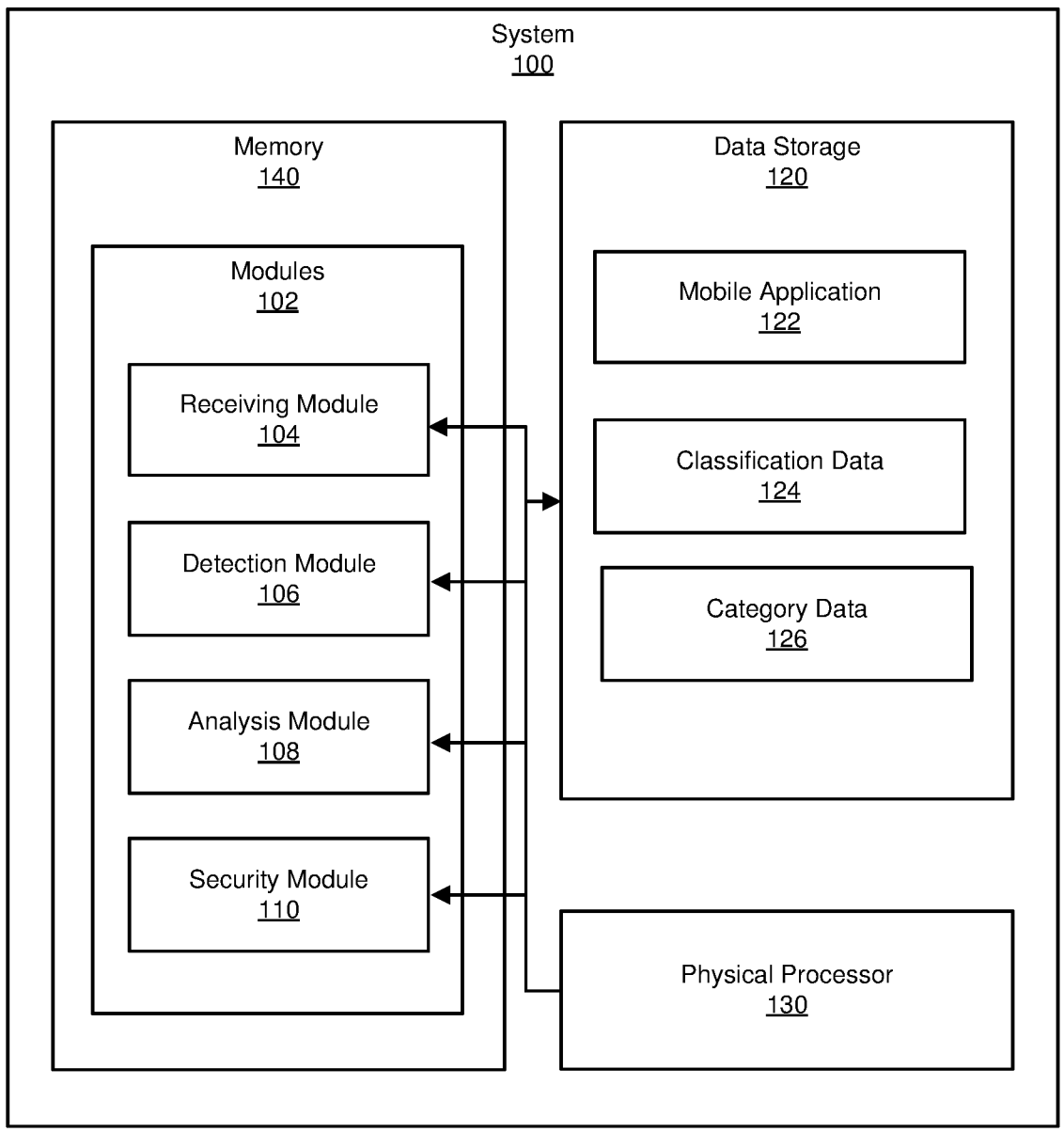
FIG. 1 is a block diagram of an example system for identifying unsolicited communications on a computing device.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for identifying unsolicited communications on a computing device. An increased number of unsolicited communications received from unrecognized phone numbers may have a negative impact for users, as the users may be disrupted by numerous phone calls or messages or may be misled or deceived by malicious users. Conventional ways to block unsolicited calls include users manually responding to the unsolicited calls by blocking the phone number, using crowd-sourced reputational data of the phone number of the unsolicited call to block the phone number, or acquiring lists of phone numbers determined to be spam or fraudulent (e.g., governments or organizations may make such lists available to users).

In some examples, communications may be fishing attempts for personal information, advertisements, and/or may include malware or unwanted content. In some existing solutions, to provide phone number reputation information of incoming calls and text messages in computing devices, systems may retrieve native call and text information and any reputation information associated with the phone number. However, such methods may take time to collect enough information to classify unknown phone numbers accurately, as users may need to report information to use to classify the unknown phone numbers. Conventional methods may not be able to accurately identify newly encountered phone numbers, which may lead to users interacting with unsolicited communications, thereby leaving the user vulnerable to the malicious intent of the originators of the communication.

The systems and methods described herein are directed to categorizing phone numbers receiving unsolicited communications. Phone numbers may be associated with classification data through data reported from users receiving communications from unrecognized phone numbers. The classification data may be used to classify the types of communications received from such phone numbers. New phone numbers may be difficult to classify because they are not associated with any type of classification data, which may result in users not being able to manage interactions with the new phone numbers. The systems and methods described herein are directed to collecting data associated with phone numbers receiving unsolicited communications, which enable the phone numbers receiving the calls to be categorized. The categories may indicate how prone the phone numbers are to receiving a specific type of communication (e.g., spam, fraud, or benign communications). Based on the category associated with the phone number receiving a communication from an unrecognized phone number, the systems and methods herein may pre-classify the communication from the unrecognized phone number to enable management of interactions with the incoming communication. Although the systems and methods described herein utilize categories such as "spam-prone", "spam-adverse", "fraud-prone", "fraud-adverse", "benign", etc., such categories are only examples to provide clarity in the description of certain embodiments described herein and should not be construed as limiting in any way.

Figure 2:
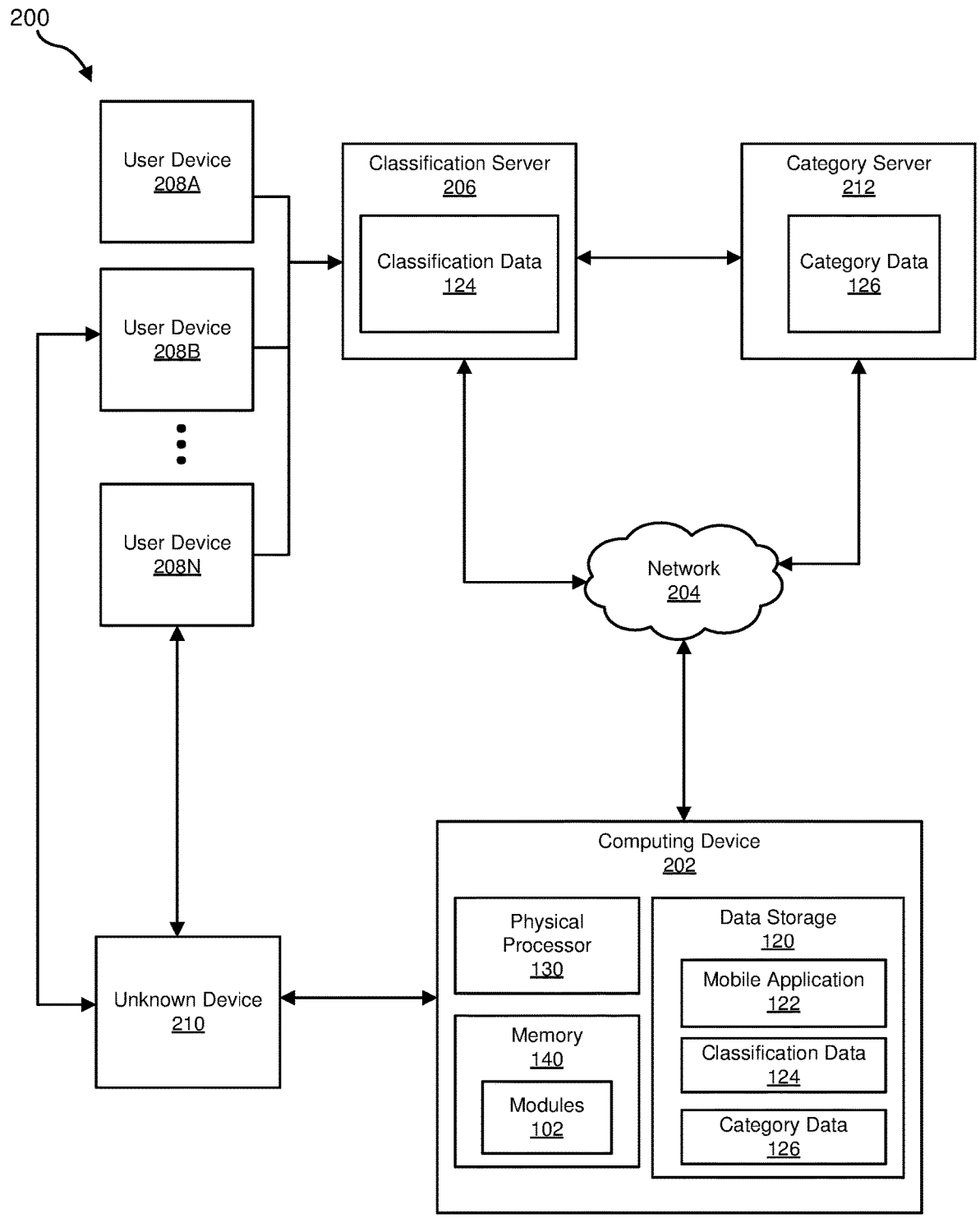
FIG. 2 is a block diagram of an additional example system for identifying unsolicited communications on a computing device.

The following will provide, with reference to FIGS. 1-2, detailed descriptions of example systems for identifying unsolicited communications on a computing device. Detailed descriptions of corresponding computer-implemented methods will also be provided in connection with FIGS. 3-4. A detailed description of data flow through the example system for A detailed description of data flow through the example system for preventing display of blocked content, will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for identifying unsolicited communications on a computing device. As illustrated in this figure, example system 100 may include one or more modules 102 for performing one or more tasks. As will be explained in greater detail below, modules 102 may include a receiving module 104, a detection module 106, an analysis module 108, and a security module 110. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., computing device 202, classification server 206, and/or category server 212). One or more of the modules 102 in FIG. 1 may also represent all or portions of one or more special-purpose computers configured to perform one or more tasks.

As illustrated in FIG. 1, the example system 100 may also include one or more memory devices, such as memory 140. The memory 140 generally represents any type or form of volatile or non-volatile storage device or medium capable of storing data and/or computer-readable instructions. In one example, the memory 140 may store, load, and/or maintain one or more of the modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, the example system 100 may also include one or more physical processors, such as physical processor 130. The physical processor 130 generally represents any type or form of hardware-implemented processing unit capable of interpreting and/or executing computer-readable instructions. In one example, the physical processor 130 may access and/or modify one or more of the modules 102 stored in the memory 140. Additionally, or alternatively, the physical processor 130 may execute one or more of the modules 102 to facilitate identifying unsolicited communications on a computing device. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, the example system 100 may also include data storage 120. The data storage 120 generally represents any type or form of computing device capable of data storage. In one example, the data storage 120 may store one or more mobile applications 122, classification data 124, and/or category data 126. As described herein, the classification data 124 for unrecognized phone numbers may be determined and stored in the data storage 120. The category data 126 for the computing device 202 may be stored in the data storage 120 and may be updated based on data received from a remote server, such as the category server 212.

The example system 100 in FIG. 1 may be implemented in a variety of ways. For example, all or a portion of the example system 100 may represent portions of the example system 200 in FIG. 2. As shown in FIG. 2, the system 200 may include a computing device 202 in communication with a classification server 206 and/or a category server 212 via a network 204. In one example, all or a portion of the functionality of the modules 102 may be performed by the computing device 202, the classification server 206, the category server 212, and/or any other suitable computing system. As will be described in greater detail below, one or more of the modules 102 from FIG. 1 may, when executed by at least one processor of the computing device 202, the classification server 206 and/or the category server 212, enable the computing device 202, the classification server 206, and/or the category server 212 to identify unsolicited communications on a computing device 202. For example, and as will be described in greater detail below, one or more of modules 102 may cause the computing device 202, the classification server 206, and/or the category server 212 to receive a communication from an unknown device 210 associated with an unrecognized phone number, obtain the unrecognized phone number from the communication, obtain classification data 124 associated with the unrecognized phone number, obtain category data 126 associated with a phone number of the computing device 202, determine that the communication is an unsolicited communication based on the classification data 124 of the unrecognized phone number and the category data 126 associated with the phone number of the computing device 202, and in response to determining that the communication is unsolicited, perform a security action to manage interactions with the communication from the unknown device 210 associated with the unrecognized phone number The computing device 202 generally represents any type or form of computing device capable of reading computer-executable instructions. For example, the computing device 202 may include an endpoint device (e.g., a mobile computing device) capable of receiving communications for a phone number, such as a phone call, text message, or social networking messages. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device The classification server 206 generally represents any type or form of computing device that is capable of reading computer-executable instructions. In one example, the classification server 206 may be a server hosting a platform to facilitate collection, analysis, and distribution of classification data 124 for unrecognized phone numbers. Additional examples of the classification server 206 include, without limitation, security servers, application servers, web servers, storage servers, and/or database servers configured to run certain software applications and/or provide various security, web, storage, and/or database services. Although illustrated as a single entity in FIG. 2, the classification server 206 may include and/or represent a plurality of servers that work and/or operate in conjunction with one another.

The category server 212 generally represents any type or form of computing device that is capable of reading computer-executable instructions. In one example, the category server 212 may be a server hosting a platform to facilitate collection, analysis, and distribution of communication profiles for phone numbers that receive communications from unrecognized phone numbers. The communication profiles for phone numbers may include category data 126 for phone numbers devices, such as user devices 208A, 208B, and 208N, as well as computing device 202. Additional examples of the category server 212 include, without limitation, security servers, application servers, web servers, storage servers, and/or database servers configured to run certain software applications and/or provide various security, web, storage, and/or database services. Although illustrated as a single entity in FIG. 2, the category server 212 may include and/or represent a plurality of servers that work and/or operate in conjunction with one another.

The network 204 generally represents any medium or architecture capable of facilitating communication or data transfer. In one example, the network 204 may facilitate communication between the computing device 202, the classification server 206, and/or the category server 212. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
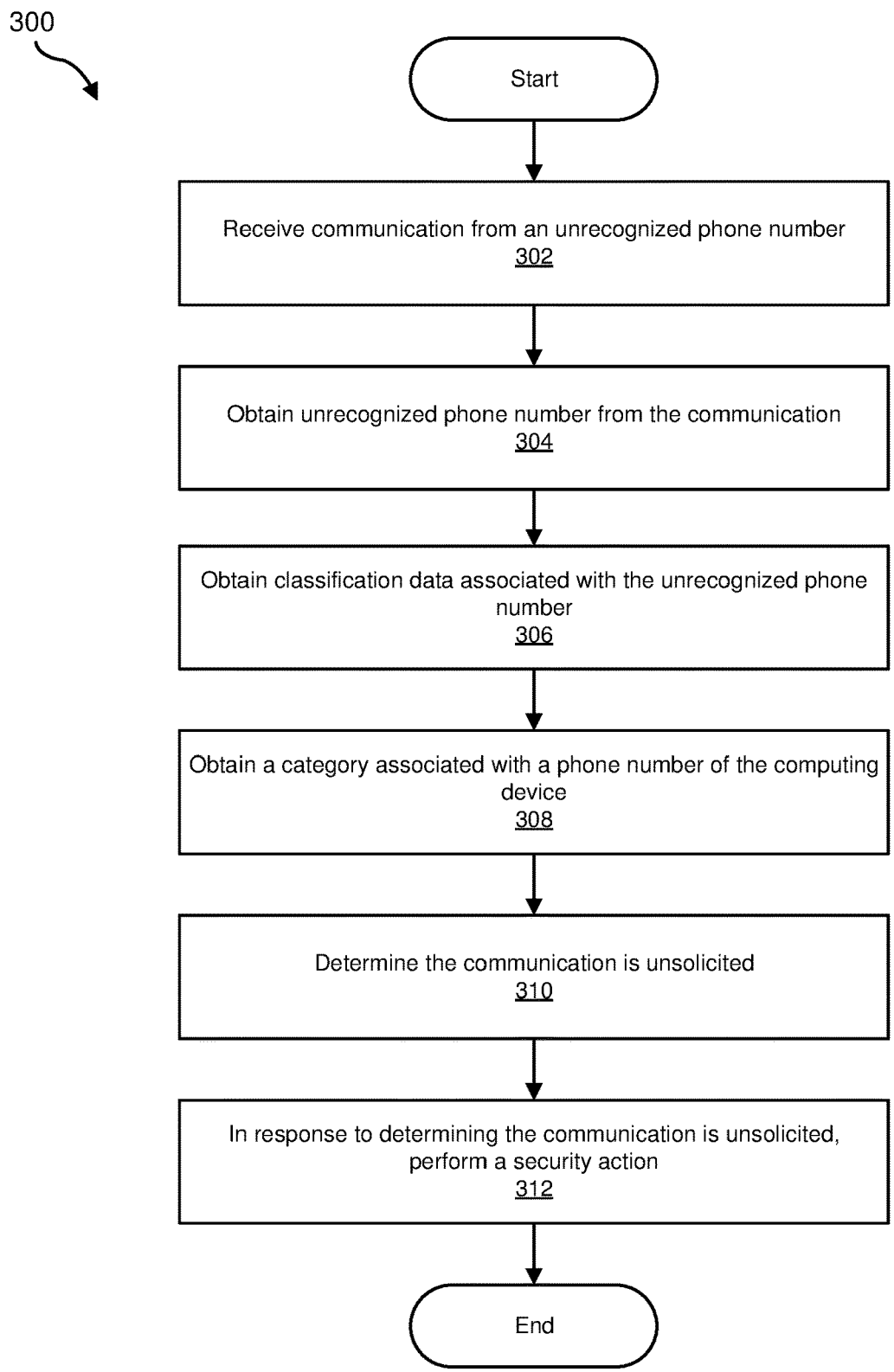
FIG. 3 is a flow diagram of an example method for identifying unsolicited communications on a computing device.

FIG. 3 is a flow diagram of an example computer-implemented method 300 for identifying unsolicited communications on a computing device. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a communication from an unrecognized phone number. The system may perform step 302 in any suitable manner. For example, the receiving module 104 may, as part of computing device 202 in FIG. 2, receive data associated with a communication (e.g., phone call or a message) through mobile application 122. For example, the communication may originate from the unknown device 210. The unknown device 210 may initiate a telephone call to the computing device 202, which may be received by receiving module 104 of the computing device 202.

The term "mobile application," as used herein, generally refers to an application that provides phone call or messaging capabilities and/or voice call features utilizing network communications. In some examples, mobile applications may be social messaging applications or social networking applications, such as Vonage™, Messages™, or the like.

The term "communication," as used herein, generally refers to a phone call, text message, or message transmitted to a user of a mobile application, such as mobile application 122, executing on a computing device. The communication may be transmitted by or in association with a phone number. Examples of communications may include, but are not limited to phone calls, text messages, emails, and/or messages sent through the mobile application associated with a phone number.

The term "unrecognized phone number," as used herein, generally refers to a phone number associated with an incoming communication from a device, such as the unknown device 210, that is not known to the recipient. In some examples, the unrecognized phone number may be a new phone number that is unknown to systems, such as the example system 100 or the example system 200. In some examples, the unrecognized phone number may be a phone number that is not known to the computing device receiving the incoming communication but known to systems, such as the example system 100 or the example system 200.

At step 304, one or more systems described herein may obtain the unrecognized phone number from the communication. The system may obtain the unrecognized phone number from the communication in any suitable manner. For example, the detection module 106 may parse the information associated with the communication to obtain the unrecognized phone number. The detection module 106 may obtain the unrecognized phone number by retrieving the native call and/or text information from the communication. In some examples, the detection module 106 may use one or more known algorithms to identify the unrecognized phone number from the received communication. For example, the detection module 106 may process the received data to find any set of numbers and determine whether the numbers are a telephone number.

At step 306, one or more systems described herein may obtain classification data 124 using the unrecognized phone number. The system may perform step 306 in any suitable manner. For example, the analysis module 108 may transmit the unrecognized phone number to a server, such as the classification server 206. The classification server 206 may query a data store, using the unrecognized phone number, to identify any classification data 124 associated with the unrecognized phone number.

The term "classification data," as used herein, generally refers to any type of data that may be used to classify phone numbers associated with an incoming communication. For example, classification data may indicate whether an unrecognized phone number is associated with a spammer, a robocaller, has transmitted fraudulent messages, or is benign. The classification data may be historical data that has been collected from many users of the system who have provided feedback with regards to the unrecognized phone number. In some examples, the classification data may be a collection of data obtained from analyzing communications that have been transmitted through the system, which may be identified based on the content of the message, originator of the message, or the like.

In some examples, classification data 124, which may also be referred to as reputation data, for incoming calls from unrecognized phone numbers may be generated using data collected through one or more known crowdsourcing methodologies. Different types of data may be collected from user devices, such as user devices 208A, 208B, and 208N (collectively referred to as 208). For example, the user devices 208B and 208N may receive incoming calls from unrecognized phone numbers, such as from unknown device 210 associated with an unrecognized phone number. A user of the user device 208B may be requested to provide data about the phone call from the unrecognized phone number. Examples of the types of data requested from the user may include, but are not limited to, categorization of the call (e.g., spam, fraud, benign, etc.), identification of the caller or organization that placed the call, the type of call received (e.g., recording or live person), or the like. In some examples, the data collected may be inferred from a user interaction with the incoming phone call rather than direct collection of data from a user. For example, the classification server 206 may receive information from the user devices 208 about the incoming call from the unrecognized phone number, such as time and date of the phone call, user interaction with the incoming phone call (e.g., ignored phone call, rejected phone call, sent to voicemail, etc.), the number of phone calls received from the unrecognized phone call within a time period, or the like.

In some examples, the request for data may be presented to a user of the user device, such as user device 208B, upon detection of a completion of a call or an action taken in response to receiving the call (e.g., ignoring or rejecting the call). The request for data may be presented through a push notification, overlay, email, application message, or other means of displaying the request and obtaining direct information from the user of the user device 208B. In some examples, the request may be a call originating from the classification server 206 requesting the data via a phone call, which a user of the user device 208B may respond to orally or using a number pad of the user device 208B. The data collected from user devices, such as user device 208B, may processed by the classification server 206 to generate classification data 124 to associate with the unrecognized phone number.

In some examples, if classification data 124 for an unrecognized number does not exist (e.g., the number is unknown to the system), the classification data 124 associated with an unrecognized phone number may be generated based on categories of the phone numbers that received calls from the unrecognized phone number. For example, if the unrecognized phone number does not have any classification data 124 associated with it (e.g., due to the newness of the number), then the classification server 206 may obtain category data 126 from a category server, such as category server 212. The classification server 206 may generate classification data 124 for the unrecognized phone number by analyzing the categories of the phone numbers that the unrecognized phone number contacted. For example, with reference to FIG. 2, if an unrecognized phone number does not have any associated classification data 124, the classification server 206 may communicate with the other servers, such as a logging server and/or the category server 212. A logging server may identify any user devices 208 and/or computing devices 202 contacted by the unrecognized phone number. The category server 212 may then obtain the category data 126 associated with each of the identified user devices 208 and/or computing devices 202.

The classification server 206 may generate classification data 124 for the unrecognized phone number using the category data 126 associated with each of the identified user devices 208 and/or computing devices 202 contacted by the unrecognized phone number. In some examples, the classification server 206 may convert the categories into a numeric value or use the confidence scores associated with each of the categories of the identified devices. In some examples, the confidence scores may be indicative of a likelihood or accuracy of the category type. For instance, if a phone number has received one spam call and one benign call, the phone number may be categorized as spam-prone with a confidence score of 50%. As the number of spam calls that contact that number increases, the confidence score for the category spam-prone would also increase. The classification server 206 may take an average of the categories or confidence scores and use the average to generate classification data 124 to associated with the unrecognized phone number. For example, if all of the devices contacted by the unrecognized phone number are categorized as spam-prone, the unrecognized phone number may be classified as spam.

If the unrecognized phone number contacted a threshold number of phone numbers categorized, for example, as spam-prone or fraud-prone, then the classification data 124 for the unrecognized phone number may be that it is spam or fraud. Likewise, if the unrecognized phone number contacted a threshold number of phone numbers categorized as spam-adverse or fraud-adverse, then the classification data 124 for the unrecognized phone number may indicate that it is likely a benign number. Based on ratio of the number of communications made by the unrecognized phone number to a certain category of phone numbers to overall number of communications, a confidence score may be calculated and maintained in relation to the likelihood that the unrecognized phone number is a certain type of caller.

At step 308, one or more systems described herein may obtain category data 126 using the phone number of the computing device. The system may perform step 308 in any suitable manner. For example, the analysis module 108 may transmit the phone number of the computing device to a server, such as the category server 212. The category server 212 may query a data store using the phone number, to identify category data 126 associated with the phone number of the computing device.

The term "category data," as used herein, generally refers to an indication of a type or label used to classify phone numbers that receive incoming communications (e.g., call or message). For example, category data may indicate whether a phone number is likely to be contacted by a spammer, a robocaller, or phone number that has transmitted fraudulent messages. The category data may use historical data of a phone number to determine the types of communications a phone number is likely to receive. In some examples, the category data may be a collection of data obtained from analyzing communications that have been received from phone numbers known to the system. Multiple categories may be associated with a phone number for a computing device. For example, a phone number may be spam-prone and fraud-prone, spam-prone and fraud-adverse, spam-adverse and fraud-prone, or spam-adverse and fraud-adverse. Although described in terms of spam and fraud, category data for phone numbers may include many different types of categories associated with a phone number. Category data may include a category type as well as a confidence score associated with the category type. The confidence score may be indicative of a likelihood or accuracy of the category type. For instance, if a phone number has received one spam call and one benign call, the phone number may be categorized as spam-prone with a confidence score of 50%. As the number of spam calls that contact that number increases, the confidence score for the category spam-prone would also increase.

At step 310, one or more systems described herein may determine that the communication is an unsolicited communication based on the classification data and/or the category data. The system may perform step 310 in any suitable manner. For example, the analysis module 108 may analyze the obtained classification data 124 of the unrecognized phone number and/or category data 126 of the phone number of the computing device 202 and may determine that the communication is an unsolicited communication. The analysis module 108 may use one or more rules to apply to the classification data 124 associated with the communication. For example, a user-specified rule may indicate that any communication that has reputation data over a predefined minimum (e.g., over 85% negative feedback in the classification data) may be categorized as unsolicited. In some examples, the classification data may be used to determine the type or category to associated with the unrecognized number that originated the communication. For example, based on the classification data 124, the analysis module 108 may determine that the communication is spam and/or a fraudulent message.

In some examples, if the analysis module 108 determines there is no classification data 124 associated with an unrecognized phone number, the analysis module 108 may generate or determine classification data 124 for the unrecognized phone number by obtaining data associated with previous communications originated by the unrecognized phone number. By identifying and analyzing the categories of the phone numbers contacted by the unrecognized phone number, the analysis module 108 may determine classification data 124 for the unrecognized phone number and determine a confidence score associated with the classification data 124 to indicate the likelihood of accuracy of the classification data 124.

If the analysis module 108 determines that classification data 124 cannot be generated for the unrecognized phone number (e.g., the unrecognized phone number has not contacted any other device in the system), the analysis module 108 may rely on the category data 126 associated with the phone number of the computing device 202 to determine whether the communication from the unrecognized phone number is unsolicited. For example, if the phone number of the computing device 202 receiving the communication is categorized as spam-prone, the analysis module 108 may classify the communication as "likely spam." In such examples, the security module 110 may, for example, at step 312, request additional data from the user to supplement the classification of the communication, which was based on the category of the phone number of the computing device 202 rather than any type of data that is used to generate classification data 124 for an unrecognized phone number.

At step 312, one or more systems described herein may, in response to determining that the communication is the unsolicited communication, perform a security action to manage interactions with the unsolicited communication received from the unrecognized phone number. The system may perform step 312 in any suitable manner. For example, the security module 110 may receive, from the analysis module 108, an indication that the communication is unsolicited. In response to receiving the indication that the communication is unsolicited, the security module 110 may perform one or more security actions.

In one example, the security action may include presenting a recommendation to the user of the mobile application. The recommendation may suggest an advised action, such as ignoring the communication or adding the unrecognized phone number to a block list. In some embodiments, the recommendation may be presented as a push notification, as an overlay to the incoming message, or some other method of presenting the recommendation in conjunction with incoming communication from the unrecognized phone number through, for example, the mobile application 122. The recommendation may include at least a portion of the classification data 124 associated with the unrecognized. In some examples, the recommendation may include a confidence score associated with the classification data 124. In some examples, the security module 110 may receive an indication to ignore or block the unrecognized number. In response to receiving the indication, the security module 110 may perform the action specified in the indication.

In response to presenting the recommendation to block the unrecognized phone number, the security module 110 may receive an indication to add the unrecognized phone number to a block list. The security module 110 may block the unrecognized phone number, in response to receiving the indication from the user. In some examples, the security module 110 may maintain a local block list to track information associated with the blocked unrecognized phone number (e.g., identifying information, content of the message, date and time message was transmitted, type of message, etc.). In some examples, the security module 110 may transmit the information associated with the communication from the now-blocked phone number to a repository on a remote server, such as category server 212, which may host a communication profile data store. The communication profile data store may store communication profile data associated with phone numbers of user devices 208 and/or computing devices 202.

In some examples, the security action may include identifying a user setting that indicates unsolicited communications are to be blocked and enforcing the user setting by blocking the unsolicited communication in response to determining that the communication is unsolicited.

In some examples, the system may present a warning to a user. The warning may include classification data 124 associated with the communication. In response to presenting the warning, the security module 110 may receive additional classification data 124 to associate with the communication. The security module 110 may transmit the additional classification data to the classification server 206 to be added to the classification data associated with the phone number of the communication. The security module 110 may transmit additional information, such as type of communication, date and time the communication was sent, and the like, to include with the additional classification data.

Figure 4:
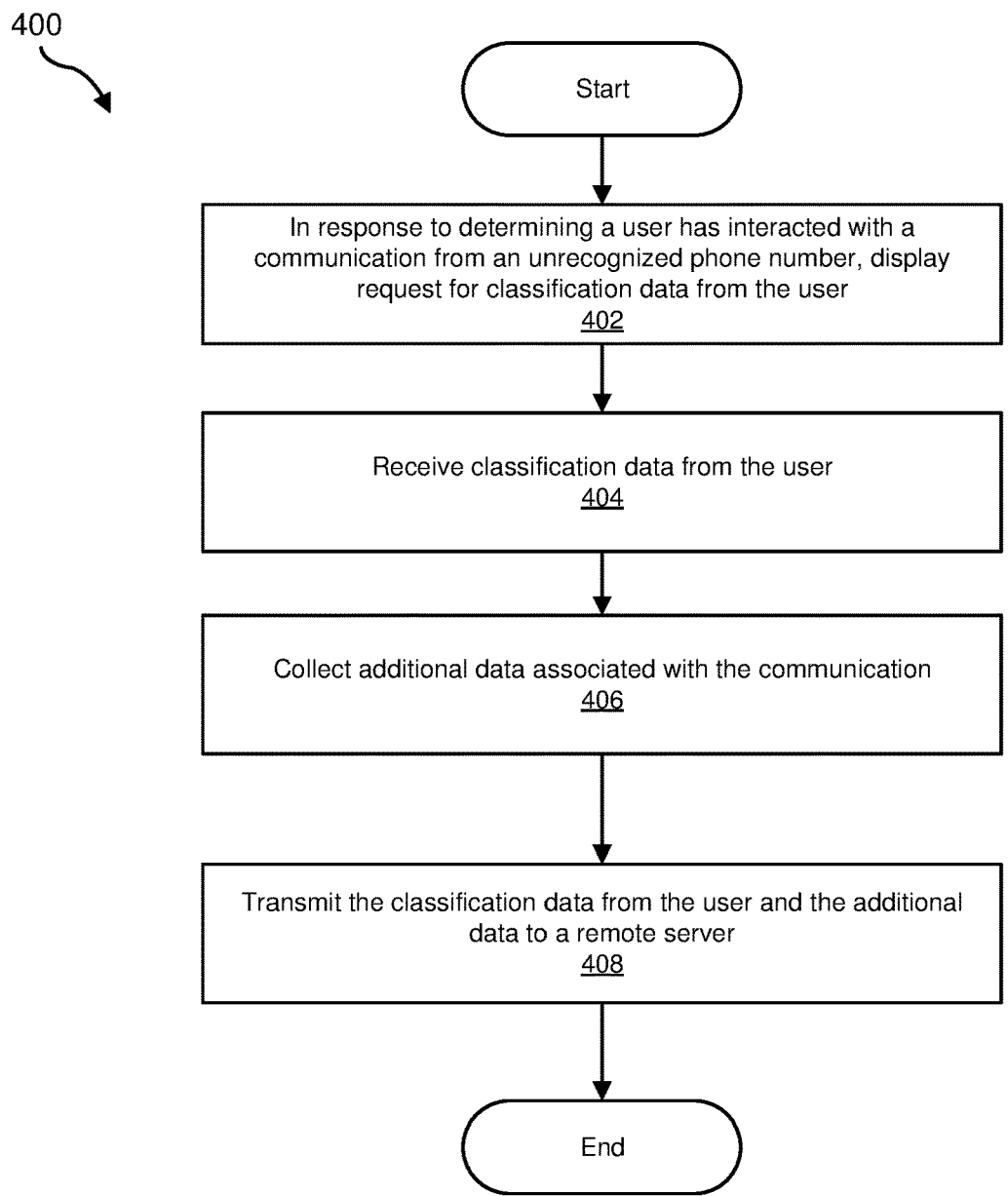
FIG. 4 is a flow diagram of an example method for collecting additional information for identifying unsolicited communications on a computing device.
Figure 5:
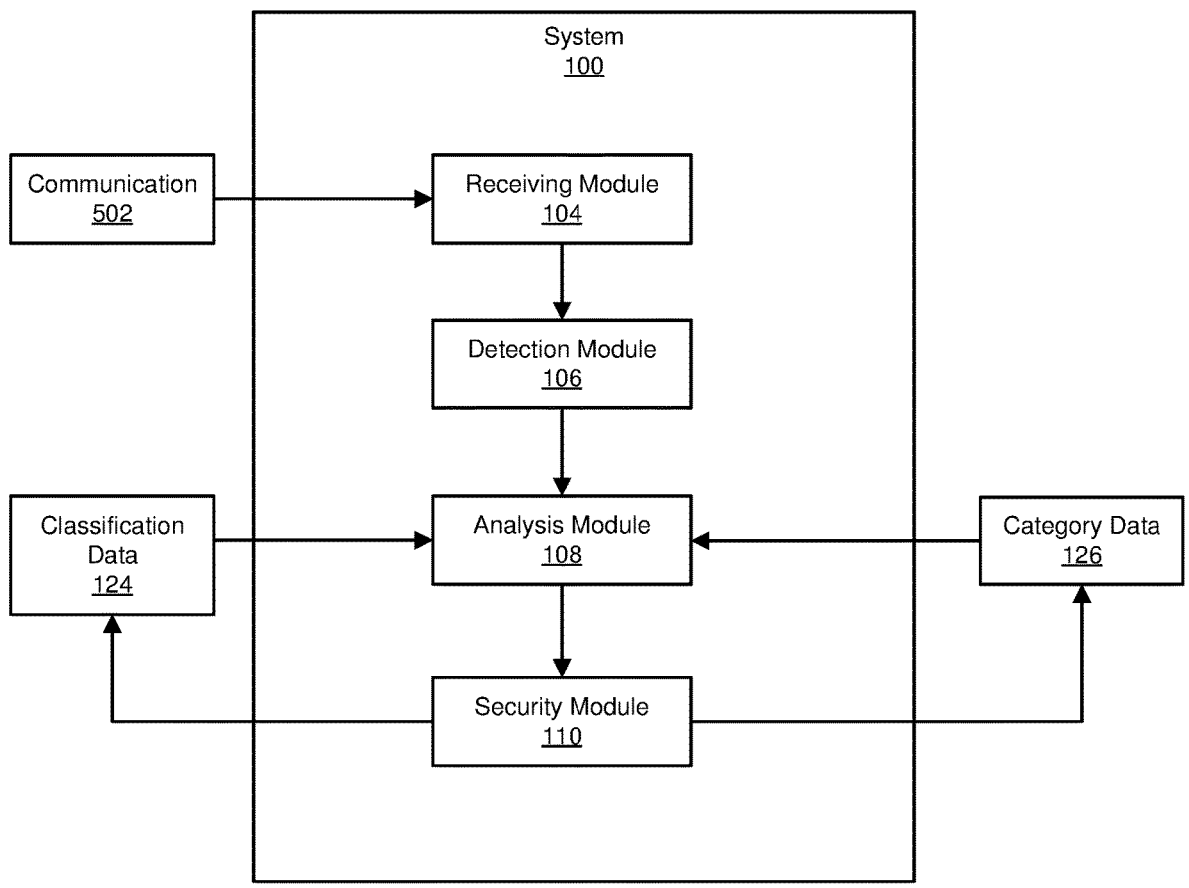
FIG. 5 is a data flow diagram of an example system identifying unsolicited communications on a computing device.

FIG. 4 is a flow diagram of an example computer-implemented method 400 for collection additional information for identifying unsolicited communications on a computing device. The steps shown in FIG. 4 may be performed by any suitable computer-executable code and/or computing system, including the system 100 in FIG. 1, the system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402, in response to determining a user has interacted with a communication from an unrecognized phone number, one or more of the systems described herein may display a request for classification data from the user. The system may perform step 402 in any suitable manner. For example, the analysis module 108 may, as part of computing device 202 in FIG. 2, in response to determining the user has interacted with the communication from the unrecognized phone number, display a request for classification data 124 from the user. In some examples, the request may be a push notification, an overlay, or some other method of displaying the request to the user of the computing device 202. The analysis module 108 may detect if the caller has ended a phone call from the unrecognized phone number, if the caller selected an "ignore" button or "send to voicemail" button in response to receiving a phone call from the unrecognized phone number, performed an action to add the unrecognized phone number to a blocklist, or the like.

At step 404, one or more systems described herein may receive classification data 124 from the user for the unrecognized phone number. The system may perform step 404 in any suitable manner. For example, the receiving module 102 may receive the classification data 124 from the user for the unrecognized phone number. The user may indicate that the unrecognized phone number is spam, fraudulent, or benign. The user may provide additional information, such as the type of communication received (e.g., pre-recorded message, request for information, etc.), a company or person associated with the communication, or the like. In some examples, the user may indicate the action they took (e.g., answer called, hung up on call, blocked called, ignored call, etc.).

At step 406, one or more systems described herein may collect additional data associated with the communication. The system may perform step 406 in any suitable manner. For example, the detection module 106 may detect one or more communications from the unrecognized phone number and obtain additional data associated with the communication. Examples of the additional data collected from the communication may, but are not limited to, include type of communication (e.g., phone call, message, text message), date and time of the communication, duration of a user interaction with the communication (e.g., duration of a phone call), additional action taken in response to the communication (e.g., adding the unrecognized phone number to a block list, selecting a link in a message to unsubscribe or remove from a caller list of the unrecognized phone number, etc.), number of communications from the unrecognized phone number, and the like.

At step 408, one or more systems described herein may transmit the classification data 124 from the user and the additional data to a remote server. The system may perform step 408 in any suitable manner. For example, the security module 110 may transmit the classification data 124 and the additional data to a remote server, such as the classification server 206 and/or the category server 212. In some examples, the classification server 206 may use the classification data 124 and the additional data to update the classification data 124 for the unrecognized phone number. For example, if the classification data received from the user indicates that the communication was spam, the classification server 206 may update the classification data 124 associated with the unrecognized phone number to indicate that the unrecognized phone number is spam.

In some examples, the category server 212 may update the category associated with the phone number that submitted the classification data 124 and the additional data. For example, if the classification data 124 and the additional data indicates that the unrecognized phone number should be classified as spam or fraudulent, then a communication profile for the phone number that submitted that classification data 124 and the additional data may be updated to increase a value or score for the phone number to indicate that the phone number is more spam-prone and/or fraud-prone. Conversely, if the unrecognized number was indicated by the classification data 124 and/or the additional data as benign (e.g., not spam or fraudulent), then the value or score for the phone number may be decreased to indicate the phone number is more spam-adverse and/or fraud-adverse.

The example system 100 in FIG. 1 may be implemented in a variety of ways. For example, all or a portion of the example system 100 may represent portions of the system 500 in FIG. 5. As will be described in greater detail below, one or more of the modules 102 from FIG. 1 may, when executed by at least one processor of the computing device 202, enable the system 500 to identify unsolicited communications on a computing device, such as the computing device 202. For example, and as will be described in greater detail herein, one or more of the modules 102 may cause the example system 500 to receive, by receiving module 104 of the computing device 202, a communication 502 from an unrecognized phone number. The detection module 106 may process the communication 502 and obtain the unrecognized phone number from the communication 502. The analysis module 108 may use the unrecognized phone number to obtain classification data 124 associated with the unrecognized phone number. The analysis module 108 may also obtain category data 126 associated with a phone number of the computing device 202. The analysis module 108 may use the classification data 124 and the category data 126 to determine that the communication 502 is an unsolicited communication. In response to determining that the communication 502 is unsolicited, the security module 110 may perform a security action to manage interactions with the communication 502 from the unrecognized phone number. In some examples, the security action may include updating the classification data 124 associated with the unrecognized phone number of the communication 502 and/or the category data 126 associated with the phone number of the computing device 202.

Although the systems and methods described herein are described in the context of end points (e.g., user devices), they may also be utilized and applied by different service providers in the phone service delivery ecosystem. For example, monitoring communications from unrecognized phone numbers may be provided by one or more phone service operators, such as mobile phone services or landline phone services. In some examples, the systems and methods described herein may be implemented and/or utilized by computing device manufacturers rather than or in conjunction with phone service operators.

The systems and methods described herein are directed to collecting and analyzing information associated with computing devices for phone numbers receiving unsolicited calls and/or messages. Phone numbers may be associated with reputation data through data reported from users receiving calls or messages from those phone numbers. The data may be used to classify the types of communications received from those phone numbers. New phone numbers may be difficult to classify, which may result in users not being able to manage interactions with the new phone numbers because the phone numbers lack sufficient reputational data to perform an informed action. The systems and methods described herein build profiles for phone numbers receiving calls which enable the phone numbers to be categorized. The categories may indicate how prone the phone numbers are to receiving spam or fraudulent calls. Based on the category associated with a phone number receiving a call from an unrecognized phone number, the systems and methods herein may pre-qualify the calls from the unrecognized phone number to manage interactions with the incoming call.

Figure 6:
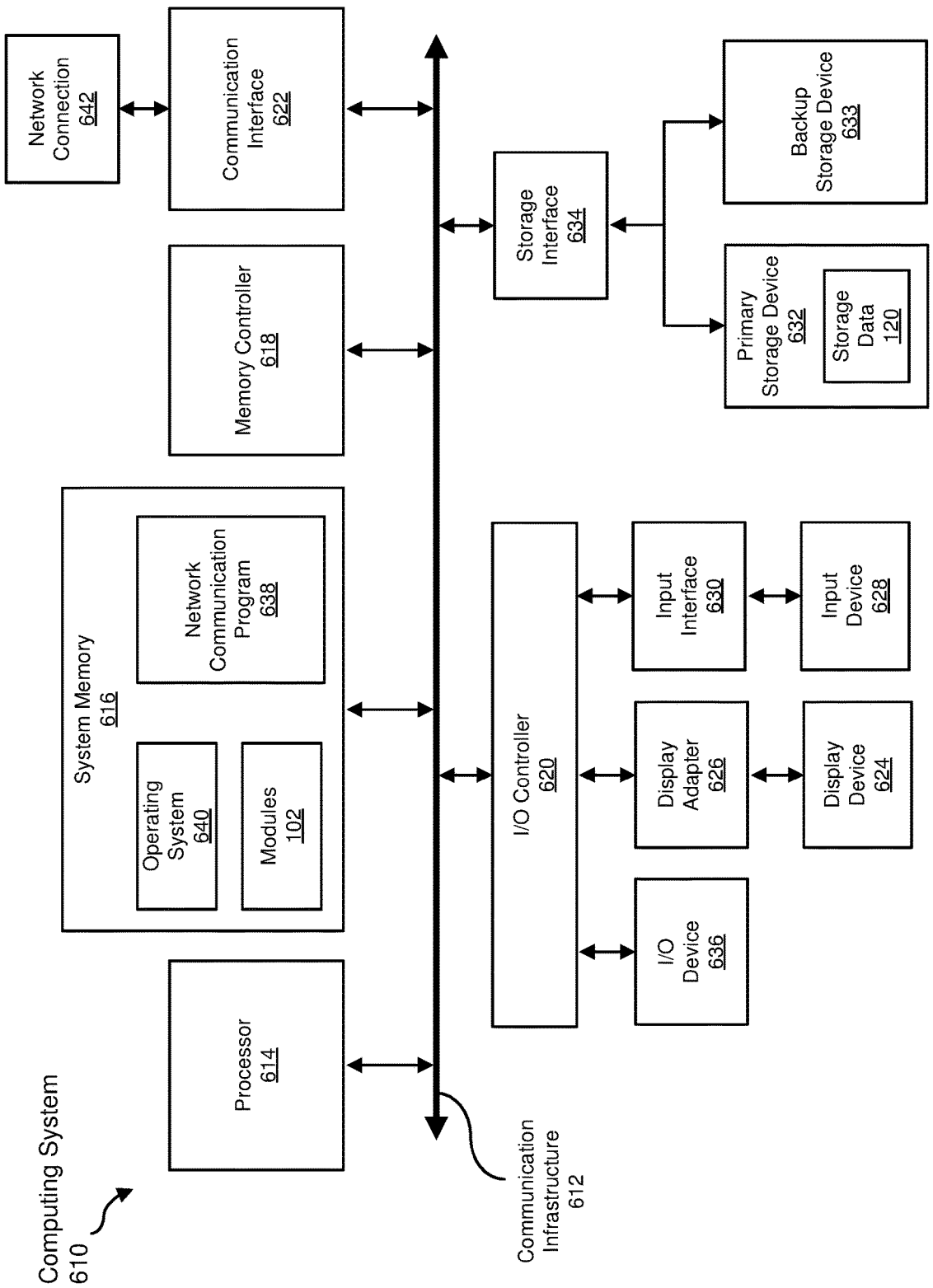
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of the computing system 610 may perform and/or be a means for performing, either alone or in combination with other elements, one or more of the steps described herein (such as one or more of the steps illustrated in FIGS. 3-4). All or a portion of the computing system 610 may also perform and/or be a means for performing any other steps, methods, or processes described and/or illustrated herein.

The computing system 610 broadly represents any single or multi-processor computing device or system capable of executing computer-readable instructions. Examples of the computing system 610 include, without limitation, workstations, laptops, client-side terminals, servers, distributed computing systems, handheld devices, or any other computing system or device. In its most basic configuration, the computing system 610 may include at least one processor 614 and a system memory 616.

The processor 614 generally represents any type or form of physical processing unit (e.g., a hardware-implemented central processing unit) capable of processing data or interpreting and executing instructions. In certain embodiments, the processor 614 may receive instructions from a software application or module. These instructions may cause the processor 614 to perform the functions of one or more of the example embodiments described and/or illustrated herein.

The system memory 616 generally represents any type or form of volatile or non-volatile storage device or medium capable of storing data and/or other computer-readable instructions. Examples of the system memory 616 include, without limitation, Random Access Memory (RAM), Read Only Memory (ROM), flash memory, or any other suitable memory device. Although not required, in certain embodiments, the computing system 610 may include both a volatile memory unit (such as, for example, the system memory 616) and a non-volatile storage device (such as, for example, the primary storage device 632, as described in detail below). In one example, one or more of the modules 102 from FIG. 1 may be loaded into the system memory 616.

In some examples, the system memory 616 may store and/or load an operating system 640 for execution by the processor 614. In one example, the operating system 640 may include and/or represent software that manages computer hardware and software resources and/or provides common services to computer programs and/or applications on the computing system 610. Examples of the operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, the example computing system 610 may also include one or more components or elements in addition to the processor 614 and the system memory 616. For example, as illustrated in FIG. 6, the computing system 610 may include a memory controller 618, an Input/Output (I/O) controller 620, and a communication interface 622, each of which may be interconnected via a communication infrastructure 612. The communication infrastructure 612 generally represents any type or form of infrastructure capable of facilitating communication between one or more components of a computing device. Examples of the communication infrastructure 612 include, without limitation, a communication bus (such as an Industry Standard Architecture (ISA), Peripheral Component Interconnect (PCI), PCI Express (PCIe), or similar bus) and a network.

The memory controller 618 generally represents any type or form of device capable of handling memory or data or controlling communication between one or more components of the computing system 610. For example, in certain embodiments the memory controller 618 may control communication between the processor 614, the system memory 616, and the I/O controller 620 via the communication infrastructure 612.

The I/O controller 620 generally represents any type or form of module capable of coordinating and/or controlling the input and output functions of a computing device. For example, in certain embodiments the I/O controller 620 may control or facilitate transfer of data between one or more elements of the computing system 610, such as the processor 614, the system memory 616, the communication interface 622, the display adapter 626, the input interface 630, and the storage interface 634.

As illustrated in FIG. 6, the computing system 610 may also include at least one display device 624 coupled to the I/O controller 620 via a display adapter 626. The display device 624 generally represents any type or form of device capable of visually displaying information forwarded by the display adapter 626. Similarly, the display adapter 626 generally represents any type or form of device configured to forward graphics, text, and other data from the communication infrastructure 612 (or from a frame buffer, as known in the art) for display on the display device 624.

As illustrated in FIG. 6, the example computing system 610 may also include at least one input device 628 coupled to the I/O controller 620 via an input interface 630. The input device 628 generally represents any type or form of input device capable of providing input, either computer or human generated, to the example computing system 610. Examples of the input device 628 include, without limitation, a keyboard, a pointing device, a speech recognition device, variations or combinations of one or more of the same, and/or any other input device.

Additionally, or alternatively, the example computing system 610 may include additional I/O devices. For example, the example computing system 610 may include the I/O device 636. In this example, the I/O device 636 may include and/or represent a user interface that facilitates human interaction with the computing system 610. Examples of the I/O device 636 include, without limitation, a computer mouse, a keyboard, a monitor, a printer, a modem, a camera, a scanner, a microphone, a touchscreen device, variations or combinations of one or more of the same, and/or any other I/O device.

The communication interface 622 broadly represents any type or form of communication device or adapter capable of facilitating communication between the example computing system 610 and one or more additional devices. For example, in certain embodiments, the communication interface 622 may facilitate communication between the computing system 610 and a private or public network including additional computing systems. Examples of the communication interface 622 include, without limitation, a wired network interface (such as a network interface card), a wireless network interface (such as a wireless network interface card), a modem, and any other suitable interface. In at least one embodiment, the communication interface 622 may provide a direct connection to a remote server via a direct link to a network, such as the Internet. The communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 622 may also represent a host adapter configured to facilitate communication between the computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like.

Communication interface 622 may also allow the computing system 610 to engage in distributed or remote computing. For example, the communication interface 622 may receive instructions from a remote device or send instructions to a remote device for execution.

In some examples, the system memory 616 may store and/or load a network communication program 638 for execution by the processor 614. In one example, the network communication program 638 may include and/or represent software that enables the computing system 610 to establish a network connection 642 with another computing system (not illustrated in FIG. 6) and/or communicate with the other computing system by way of the communication interface 622. In this example, the network communication program 638 may direct the flow of outgoing traffic that is sent to the other computing system via the network connection 642. Additionally, or alternatively, the network communication program 638 may direct the processing of incoming traffic that is received from the other computing system via the network connection 642 in connection with the processor 614.

Although not illustrated in this way in FIG. 6, the network communication program 638 may alternatively be stored and/or loaded in the communication interface 622. For example, the network communication program 638 may include and/or represent at least a portion of software and/or firmware that is executed by a processor and/or Application Specific Integrated Circuit (ASIC) incorporated in the communication interface 622.

As illustrated in FIG. 6, the example computing system 610 may also include a primary storage device 632 and a backup storage device 633 coupled to communication infrastructure 612 via a storage interface 634. The storage devices 632 and 633 generally represent any type or form of storage device or medium capable of storing data and/or other computer-readable instructions. For example, the storage devices 632 and 633 may be a magnetic disk drive (e.g., a so-called hard drive), a solid state drive, a floppy disk drive, a magnetic tape drive, an optical disk drive, a flash drive, or the like. The storage interface 634 generally represents any type or form of interface or device for transferring data between storage devices 632 and 633 and other components of the computing system 610. In one example, the data storage 120 from FIG. 1 may be stored and/or loaded in the primary storage device 632.

In certain embodiments, the storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 632 and 633 may also include other similar structures or devices for allowing computer software, data, or other computer-readable instructions to be loaded into the computing system 610. For example, the storage devices 632 and 633 may be configured to read and write software, data, or other computer-readable information. The storage devices 632 and 633 may also be a part of the computing system 610 or may be a separate device accessed through other interface systems.

Many other devices or subsystems may be connected to the computing system 610. Conversely, all of the components and devices illustrated in FIG. 6 need not be present to practice the embodiments described and/or illustrated herein. The devices and subsystems referenced above may also be interconnected in different ways from that shown in FIG. 6. The computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 610. All or a portion of the computer program stored on the computer-readable medium may then be stored in the system memory 616 and/or various portions of the storage devices 632 and 633. When executed by the processor 614, a computer program loaded into the computing system 610 may cause the processor 614 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 610 may be configured as an Application Specific Integrated Circuit (ASIC) adapted to implement one or more of the example embodiments disclosed herein.

Figure 7:
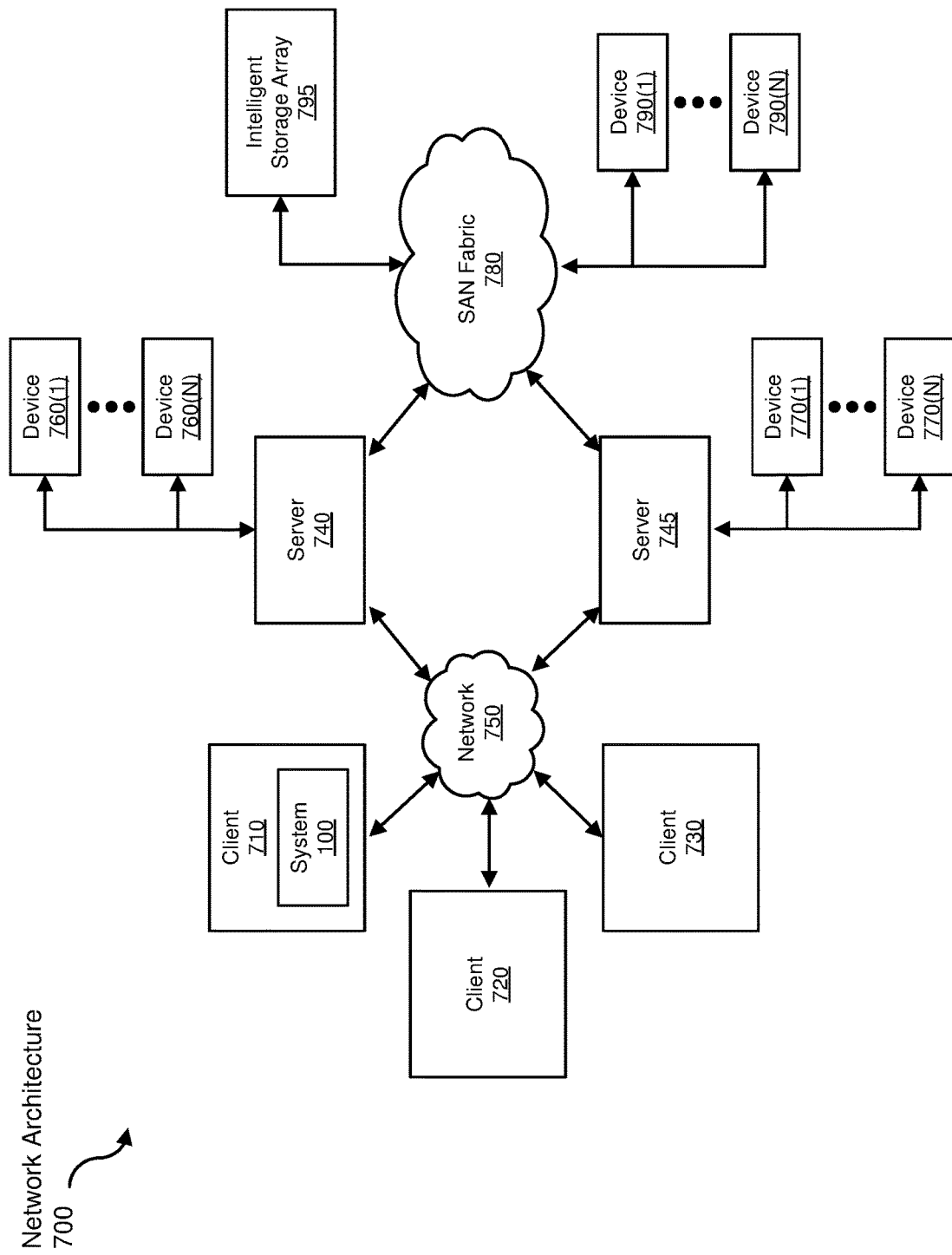
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of the network architecture 700 may perform and/or be a means for performing, either alone or in combination with other elements, one or more of the steps disclosed herein (such as one or more of the steps illustrated in FIGS. 3-4). All or a portion of the network architecture 700 may also be used to perform and/or be a means for performing other steps and features set forth in the instant disclosure.

The client systems 710, 720, and 730 generally represent any type or form of computing device or system, such as the example computing system 610 in FIG. 6. Similarly, the servers 740 and 745 generally represent computing devices or systems, such as application servers or database servers, configured to provide various database services and/or run certain software applications. The network 750 generally represents any telecommunication or computer network including, for example, an intranet, a WAN, a LAN, a PAN, or the Internet. In one example, the client systems 710, 720, and/or 730 and/or the servers 740 and/or 745 may include all or a portion of the system 100 from FIG. 1.

As illustrated in FIG. 7, one or more storage devices 760(1)-(N) may be directly attached to the server 740. Similarly, the one or more storage devices 770(1)-(N) may be directly attached to the server 745. The storage devices 760(1)-(N) and the storage devices 770(1)-(N) generally represent any type or form of storage device or medium capable of storing data and/or other computer-readable instructions. In certain embodiments, the storage devices 760(1)-(N) and the storage devices 770(1)-(N) may represent Network-Attached Storage (NAS) devices configured to communicate with the servers 740 and 745 using various protocols, such as Network File System (NFS), Server Message Block (SMB), or Common Internet File System (CIFS).

The servers 740 and 745 may also be connected to a Storage Area Network (SAN) fabric 780. The SAN fabric 780 generally represents any type or form of computer network or architecture capable of facilitating communication between a plurality of storage devices. The SAN fabric 780 may facilitate communication between the servers 740 and 745 and a plurality of the storage devices 790(1)-(N) and/or an intelligent storage array 795. The SAN fabric 780 may also facilitate, via the network 750 and the servers 740 and 745, communication between the client systems 710, 720, and 730 and the storage devices 790(1)-(N) and/or the intelligent storage array 795 in such a manner that the devices 790(1)-(N) and the array 795 appear as locally attached devices to the client systems 710, 720, and 730. As with the storage devices 760(1)-(N) and the storage devices 770(1)-(N), the storage devices 790(1)-(N) and the intelligent storage array 795 generally represent any type or form of storage device or medium capable of storing data and/or other computer-readable instructions.

In certain embodiments, and with reference to the example computing system 610 of FIG. 6, a communication interface, such as the communication interface 622 in FIG. 6, may be used to provide connectivity between each client system 710, 720, and 730 and the network 750. The client systems 710, 720, and 730 may be able to access information on the server 740 or 745 using, for example, a web browser or other client software. Such software may allow the client systems 710, 720, and 730 to access data hosted by the server 740, the server 745, the storage devices 760(1)-(N), the storage devices 770(1)-(N), the storage devices 790(1)-(N), or the intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by the server 740, the server 745, the storage devices 760(1)-(N), the storage devices 770(1)-(N), the storage devices 790(1)-(N), the intelligent storage array 795, or any combination thereof. All or a portion of one or more of the example embodiments disclosed herein may also be encoded as a computer program, stored in the server 740, run by the server 745, and distributed to the client systems 710, 720, and 730 over the network 750.

As detailed above, the computing system 610 and/or one or more components of the network architecture 700 may perform and/or be a means for performing, either alone or in combination with other elements, one or more steps of an example method for identifying unsolicited communications on a computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying unsolicited communications on a computing device, at least a portion of the method being performed by a computing device comprising at least one processor, the method comprising:

receiving, by the computing device, a communication from an unrecognized phone number;

obtaining the unrecognized phone number from the communication;

determining one or more other devices called by the unrecognized number;

determining a category associated with each of the other devices, wherein the category indicates whether each of the other devices is spam-prone or fraud-prone;

based on the category associated with each of the other devices, determining a classification of the unrecognized number, wherein the classification is at least one of spam, likely-spam, fraud, or likely-fraud;

determining a category associated with a phone number of the computing device that received the communication from the unrecognized phone number, wherein the category is at least one of either spam-prone or fraud-prone and is determined, at least in part, based on communications previously received by the computing device;

determining that the communication is an unsolicited communication based on the classification of the unrecognized number and the category associated with the phone number of the computing device that received the communication, wherein the communication is determined to be unsolicited if the classification is spam or likely-spam and the category is spam-prone or if the classification is fraud or likely-fraud and the category is fraud-prone; and in response to determining that the communication is unsolicited, performing a security action to manage interactions with the communication from the unrecognized phone number.

2. The computer-implemented method of claim 1, wherein the security action comprises:

presenting, to a user of the computing device, a recommendation to ignore the communication, wherein the recommendation comprises the classification and a confidence score associated with the classification;

receiving, in response to presenting the recommendation, an indication to ignore the communication; and in response to receiving the indication, ignoring the communication.

3. The computer-implemented method of claim 1, wherein determining a classification of the unrecognized number based on the category associated with each of the other devices further comprises analyzing data received from a user of one or more of the other devices, the data including a time and date of a call and the user interaction with the call.

4. The computer-implemented method of claim 1, wherein the security action comprises:

identifying a user setting that indicates unsolicited communications are to be blocked; and enforcing the user setting by blocking the communication in response to determining that the communication is unsolicited.

5. The computer-implemented method of claim 1, further comprising:

presenting, to a user of the computing device, a request to classify the communication;

receiving, in response to presenting the request, classification data for the communication; and transmitting the classification data and user interaction data associated with the communication to a remote server to be used to classify communications from unrecognized phone numbers and categorize phone numbers associated with users.

6. The computer-implemented method of claim 1, wherein the communication comprises at least one of:

a phone call;

a message sent through a social networking platform associated with the phone number of the computing device; or a text message.

7. The computer-implemented method of claim 1, wherein the category associated with the computing device comprises at least one of:

spam-prone; or spam-adverse.

8. The computer-implemented method of claim 1, wherein the category associated with the computing device comprises at least one of:

fraud-prone; or fraud-adverse.

9. The computer-implemented method of claim 3, further comprising updating the category associated with one or more of the other devices in response to the received data.

10. The computer-implemented method of claim 1, wherein multiple categories are associated with the computing device, with each category associated with a confidence score.

11. A system for identifying unsolicited communications on a computing device, the system comprising:

at least one physical processor;

physical memory comprising computer-executable instructions that, when executed by the physical processor, cause the physical processor to:

receive a communication from an unrecognized phone number;

obtain the unrecognized phone number from the communication;

determine one or more other devices called by the unrecognized number;

determine a category associated with each of the other devices, wherein the category indicates whether each of the other devices is spam-prone or fraud-prone;

based on the category associated with each of the other devices, determine a classification of the unrecognized number, wherein the classification is at least one of spam, likely-spam, fraud, or likely-fraud;

determine a category associated with a phone number of the computing device that received the communication from the unrecognized phone number, wherein the category is at least one of either spam-prone or fraud-prone and is determined, at least in part, based on communications previously received by the computing device;

determine that the communication is an unsolicited communication based on the classification of the unrecognized number and the category associated with the phone number of the computing device that received the communication, wherein the communication is determined to be unsolicited if the classification is spam or likely-spam and the category is spam-prone or if the classification is fraud or likely-fraud and the category is fraud-prone; and in response to determining that the communication is unsolicited, perform a security action to manage interactions with the communication from the unrecognized phone number.

12. The system of claim 11, wherein the security action comprises:

presenting, to a user of the computing device, a recommendation to ignore the communication, wherein the recommendation comprises the classification and a confidence score associated with the classification;

receiving, in response to presenting the recommendation, an indication to ignore the communication; and in response to receiving the indication, ignoring the communication.

13. The system of claim 11, wherein determining a classification of the unrecognized number based on the category associated with each of the other devices further comprises analyzing data received from a user of one or more of the other devices, the data including a time and date of a call and the user interaction with the call.

14. The system of claim 11, wherein the security action comprises:

identifying a user setting that indicates unsolicited communications are to be blocked; and enforcing the user setting by blocking the communication in response to determining that the communication is unsolicited.

15. The system of claim 11, wherein the computer-executable instructions further cause the computing device to:

present, to a user of the computing device, a request to classify the communication;

receive, in response to presenting the request, classification data for the communication; and transmit the classification data and user interaction data associated with the communication to a remote server to be used to classify communications from unrecognized phone numbers and categorize phone numbers associated with users.

16. The system of claim 11, wherein the communication comprises at least one of:

a phone call;

a message sent through a social networking platform associated with the phone number of the computing device; or a text message.

17. The system of claim 11, wherein the category associated with the computing device comprises at least one of:

spam-prone; or spam-adverse.

18. The system of claim 11, wherein the category associated with the computing device comprises at least one of:

fraud-prone; or fraud-adverse.

19. The system of claim 13, further comprising updating the category associated with one or more of the other devices in response to the received data.

20. A non-transitory computer-readable medium comprising one or more computer-executable instructions that, when executed by at least one processor of a computing device, cause the computing device to:

receive a communication from an unrecognized phone number;

obtain the unrecognized phone number from the communication;

determine one or more other devices called by the unrecognized number;

determine a category associated with each of the other devices, wherein the category indicates whether each of the other devices is spam-prone or fraud-prone;

based on the category associated with each of the other devices, determine a classification of the unrecognized number, wherein the classification is at least one of spam, likely-spam, fraud, or likely-fraud;

determine a category associated with a phone number of the computing device that received the communication from the unrecognized phone number wherein the category is at least one of either spam-prone or fraud-prone and is determined, at least in part, based on communications previously received by the computing device;

determine that the communication is an unsolicited communication based on the classification of the unrecognized number and the category associated with the phone number of the computing device that received the communication, wherein the communication is determined to be unsolicited if the classification is spam or likely-spam and the category is spam-prone or if the classification is fraud or likely-fraud and the category is fraud-prone; and in response to determining that the communication is unsolicited, perform a security action to manage interactions with the communication from the unrecognized phone number.

\* \* \* \* \*